US008365099B2

(12) United States Patent  
Cho et al.

(10) Patent No.: US 8,365,099 B2
(45) Date of Patent: Jan. 29, 2013

(54) MOBILE TERMINAL AND METHOD OF CONTROLLING THE MOBILE TERMINAL

(75) Inventors: Hang Jun Cho, Seoul (KR); Min Joo Kim, Seoul (KR); Jeong Hyuk Yoon, Seoul (KR); Yoon Hwan Kang, Seoul (KR); Sang Hyun Lee, Seoul (KR); Min Soo Park, Seoul (KR); Hyo Jin Suh, Seoul (KR); Hye Youn Cho, Seoul (KR); Hye Eun Shin, Seoul (KR); Se Il Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 809 days.

(21) Appl. No.: 12/239,519

(22) Filed: Sep. 26, 2008

(65) Prior Publication Data

US 2009/0089717 A1    Apr. 2, 2009

(30) Foreign Application Priority Data

Sep. 28, 2007  (KR) .................. 10-2007-0097897

(51) Int. Cl.
*G06F 3/033* (2006.01)
*G06F 3/00* (2006.01)
*G06F 3/048* (2006.01)
*G06F 3/14* (2006.01)
*H04B 1/034* (2006.01)

(52) U.S. Cl. ........ 715/863; 715/744; 715/747; 715/764; 715/778; 715/864; 715/866; 455/95

(58) Field of Classification Search .................. 715/863, 715/744, 747, 764, 778, 864, 866
See application file for complete search history.

(56) References Cited

U.S. PATENT DOCUMENTS

| 2004/0125081 | A1  | 7/2004 | Hayakawa |
| 2006/0217160 | A1* | 9/2006 | Lee ............................ 455/566 |
| 2007/0018957 | A1* | 1/2007 | Seo ............................ 345/156 |
| 2007/0036346 | A1* | 2/2007 | Kwon ......................... 379/413 |
| 2007/0091180 | A1* | 4/2007 | Han ........................ 348/207.99 |
| 2007/0150842 | A1  | 6/2007 | Chaudhri et al. |
| 2007/0171236 | A1* | 7/2007 | Perttula ....................... 345/619 |
| 2007/0183381 | A1* | 8/2007 | Seo et al. ..................... 370/338 |

(Continued)

FOREIGN PATENT DOCUMENTS

| CN | 1811684 A   | 8/2006 |
| CN | 101032184 A | 9/2007 |

(Continued)

OTHER PUBLICATIONS

Wikipedia: "iPhone" Internet Citation, Sep. 1, 2007, pp. 1-24. XP002508126.

(Continued)

*Primary Examiner* — Kieu Vu
*Assistant Examiner* — Eric J Bycer
(74) *Attorney, Agent, or Firm* — Birch, Stewart, Kolasch & Birch, LLP

(57) ABSTRACT

A method of controlling a mobile terminal and which includes displaying a first screen image on a touch screen of the mobile terminal as an idle background screen, receiving a touch and drag input operation being performed on the touch screen including the displayed first screen image, and displaying a second screen image corresponding to a direction of the touch and drag input operation, said second screen image corresponding to a new idle background screen.

16 Claims, 7 Drawing Sheets

U.S. PATENT DOCUMENTS

2007/0296738 A1* 12/2007 Louch et al. .................. 345/634
2008/0005698 A1* 1/2008 Koskinen et al. ............. 715/835
2008/0125179 A1 5/2008 Hamada et al.
2009/0061837 A1* 3/2009 Chaudhri et al. ............. 455/418

FOREIGN PATENT DOCUMENTS

KR  10-2007-0080918 A  8/2007
KR  10-0746874 B1  8/2007

OTHER PUBLICATIONS

Apple: "iPHONE User's Guide", Internet Citation, pp. 1-124 XP-002474183, Retrieved Mar. 27, 2008, per filing of related application EP 2043341.

* cited by examiner and a power supply unit 190. Further, any two or more of the
MOBILE TERMINAL AND METHOD OF CONTROLLING THE MOBILE TERMINAL

CROSS-REFERENCE TO RELATED APPLICATION

This application claims the priority benefit of Korean Application No. 10-2007-0097897, filed on Sep. 28, 2007, in the Korean Intellectual Property Office, the entire disclosure of which is incorporated herein by reference.

BACKGROUND OF THE INVENTION

1. Field of the Invention

The present invention relates to a mobile terminal and corresponding method for allowing a user to display a desired screen image as an idle screen background using a touch-and-drag input method.

2. Description of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

A mobile terminal also includes a graphical user interface (GUI) that allows the user to navigate through various menus and sub-menus related to the different functions available on the mobile terminal. However, many functions provided by the mobile terminal are fixed when the mobile terminal is manufactured, which limits the amount of changes a user can make to a particular function.

SUMMARY OF THE INVENTION

Accordingly, one object of the present invention is to provide a mobile terminal and corresponding method for allowing a user to designate a particular image to be used as a background screen based on a touching and dragging operation performed on the terminal.

To achieve these and other advantages and in accordance with the purpose of the present invention, as embodied and broadly described herein, the present invention provides in one aspect a method of controlling a mobile terminal and which includes displaying a first screen image on a touch screen of the mobile terminal as an idle background screen, receiving a touch and drag input operation being performed on the touch screen including the displayed first screen image, and displaying a second screen image corresponding to a direction of the touch and drag input operation, said second screen image corresponding to a new idle background screen.

In another aspect, the present invention provides a mobile terminal including a display unit including a touch screen and configured to display a first screen image on the touch screen as an idle background screen, an input unit configured to receive a touch and drag input operation being performed on the touch screen including the displayed first screen image, and a control unit configured to control the display unit to display a second screen image corresponding to a direction of the touch and drag input operation, said second screen image corresponding to a new idle background screen.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
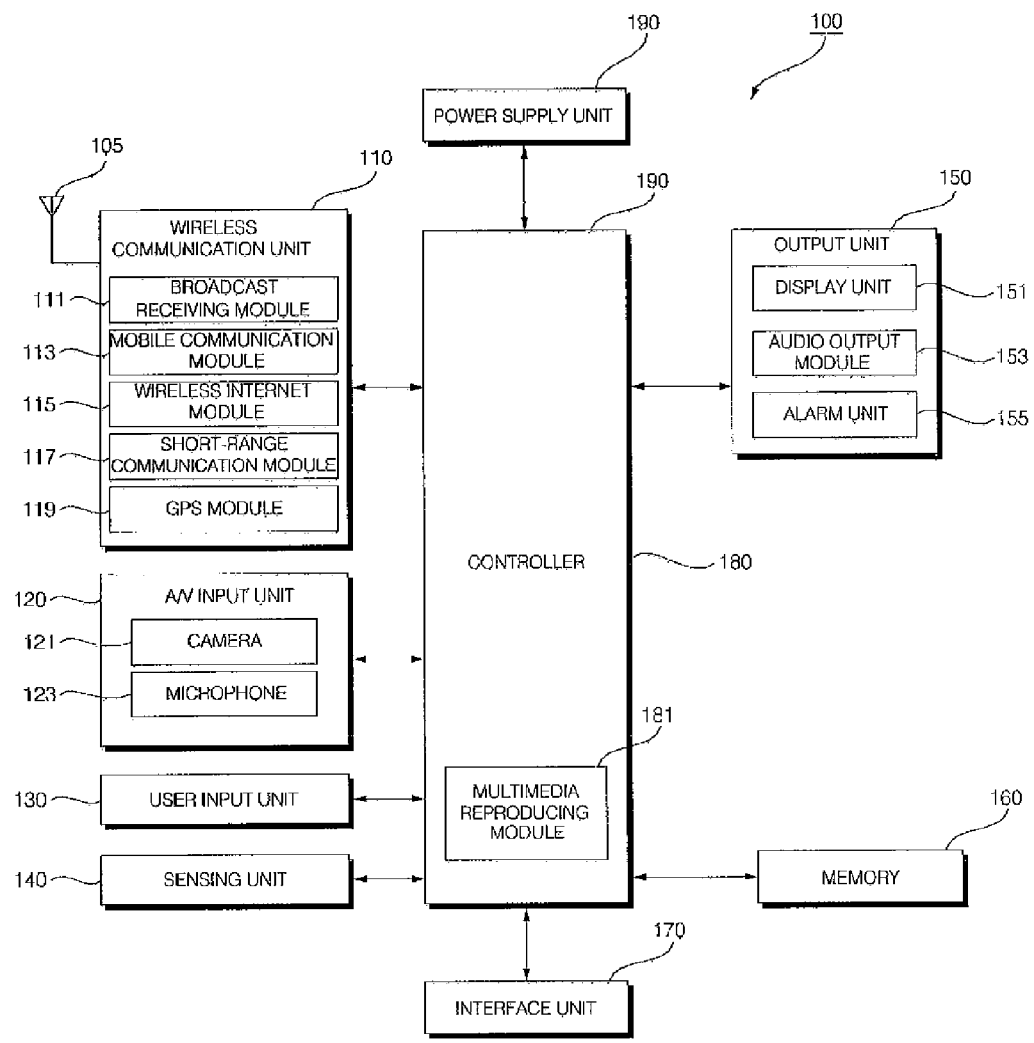
FIG. 1 is a block diagram illustrating a mobile terminal according to an embodiment of the present invention.

FIG. 1 is a block diagram illustrating a mobile terminal 100 according to an embodiment of the present invention. As shown in FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Further, any two or more of the above units may be combined into a single unit, or any part of the above units may be divided into two or more smaller units.

Further, the wireless communication unit 110 includes a broadcast reception module 111, a mobile communication module 113, a wireless Internet module 115, a short-range communication module 117, and a global positioning system (GPS) module 119. The broadcast reception module 111 receives a broadcast signal and/or broadcast-related information from an external broadcast management server through a broadcast channel. Examples of the broadcast channel include a satellite channel and a terrestrial channel. In addition, the broadcast management server may be a server that generates and transmits broadcast signals and/or broadcast-related information or a server that receives and transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. Further, the broadcast-related information may be provided to the mobile terminal 100 through a mobile communication network. In this instance, the broadcast-related information may be received by the mobile communication module 113, rather than by the broadcast reception module 111.

The broadcast-related information may also be in various forms such as an electronic program guide (EPG) of the digital multimedia broadcasting (DMB) system or an electronic service guide (ESG) of the digital video broadcast-handheld (DVB-H) system. Further, the broadcast reception module 111 may receive the broadcast signals using various broadcasting systems such as the digital multimedia broadcasting-terrestrial (DMB-T) system, the digital multimedia broadcasting-satellite (DMB-S) system, the media forward link only (MEDIAFLO) system, the DVB-H system, and the integrated services digital broadcast-terrestrial (ISDB-T) system. In addition, the broadcast reception module 111 can also be configured to be suitable for all types of broadcasting systems other than those set forth above.

Further, the broadcast signal and/or the broadcast-related information received by the broadcast reception module 111 can be stored in the memory 160. The mobile communication module 113 transmits or receives wireless signals to or from at least one of a base station, an external terminal, and a server through a mobile communication network. The wireless signals may include various types of data according to whether the mobile terminal 100 transmits/receives voice call signals, video call signals, or text/multimedia messages.

In addition, the wireless Internet module 115 is a module for wirelessly accessing the Internet and can be embedded in the mobile terminal 100 or can be installed in an external device. Also, the short-range communication module 117 is a module for short-range communication and can be configured to use various short-range communication techniques such as BLUETOOTH, radio frequency identification (RFID), infrared data association (IrDA), ultra wideband (UWB), and ZIGBEE, among others.

The GPS module 119 is configured to receive position information from a plurality of GPS satellites. In addition, the A/V input unit 120 is used to receive audio signals or video signals, and includes a camera 121 and a microphone module 123. The camera 121 processes various image frames such as still images or moving images captured by an image sensor during a video call mode or an image capturing mode, for example. Further, the image frames processed by the camera 121 can be displayed by a display module 151.

Also, the image frames processed by the camera 121 can be stored in the memory 160 or be transmitted outside the mobile terminal 100 through the wireless communication unit 110. The mobile terminal 100 may also include two or more cameras 121. Further, the microphone module 123 receives external sound signals during a call mode, a recording mode, or a voice recognition mode with the use of a microphone and converts the sound signals into electrical sound data. In the call mode, the mobile communication module 113 converts the electrical sound data into data that can be readily transmitted to a mobile communication base station and then outputs the data obtained by the conversion.

In addition, the microphone module 123 may include various noise removal algorithms to remove noise that may be generated during the reception of external sound signals. The user input unit 130 generates key input data based on user input for controlling the operation of the mobile terminal 100. In addition, the user input unit 130 can be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

Further, the sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slide-type mobile phone, the sensing unit 140 can determine whether the mobile terminal 100 is opened or closed. In addition, the sensing unit 140 can determine whether the mobile terminal 100 is powered on by the power supply unit 190 and whether the interface unit 170 is connected to an external device.

The output unit 150 can also output audio signals, video signals and alarm signals, and includes the display module 151, an audio output module 153, and an alarm module 155. Further, the display module 151 displays various information processed by the mobile terminal 100. For example, if the mobile terminal 100 is in a call mode, the display module 151 displays a user interface (UI) or a graphic user interface (GUI) for making or receiving a call. Similarly, if the mobile terminal 100 is in a video call mode or an image capturing mode, the display module 151 displays a UI or a GUI for capturing or receiving images.

As described above, if the display module 151 and the user input unit 130 form a mutual layer structure and thus are implemented as a touch screen, the display module 151 can be used not only as an output device but also as an input device. The display module 151 can also include at least one of a liquid crystal display (LCD), a thin film transistor (TFT)-LCD, an organic light-emitting diode (OLED), a flexible display, and a three-dimensional (3D) display. Further, the mobile terminal 100 can include two or more display modules 151. For example, the mobile terminal 100 can include an external display module (not shown) and an internal display module (not shown).

In addition, the audio output module 153 outputs audio data received by the wireless communication unit 110 during a call reception mode, a call mode, a recording mode, a voice recognition mode, or a broadcast reception mode or can output audio data present in the memory 160. In addition, the audio output module 153 can also output various sound signals associated with the functions of the mobile terminal 100 such as receiving a call or a message. The audio output module 153 can include a speaker and a buzzer.

Further, the alarm-module 155 outputs an alarm signal indicating the occurrence of an event in the mobile terminal 100. Examples of the event include receiving a call signal, receiving a message, and receiving a key signal, and examples of the alarm signal output by the alarm module 155 include an audio signal, a video signal and a vibration signal. The alarm module 155 can also output a vibration upon receiving a call signal or a message. In addition, the alarm module 155 can receive a key signal and output a vibration as feedback to the key signal. Thus, when the vibration is output by the alarm module 155, the user can recognize that an event has occurred. Further, a signal for notifying the user of the occurrence of an event can be output by the display module 151 or the audio output module 153.

In addition, the memory 160 stores various programs used for the operation of the controller 180, and stores various data such as a phonebook, messages, still images, or moving images. The memory 160 can include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). Further, the mobile terminal 100 may access a web storage, which performs the functions of the memory 160 on the Internet.

In addition, the interface unit 170 interfaces with an external device that can be connected to the mobile terminal 100. For example, the interface unit 170 can be a wired/wireless headset port, an external battery charger port, a wired/wireless data port, a card socket, for example, for a memory card or a subscriber identification module (SIM)/user identity module (UIM) card, an audio input/output (I/O) terminal, a video I/O terminal, or an earphone port. The interface unit 170 can also receive data from an external device or be powered by an external device, and can transmit data provided by an external device to other components in the mobile terminal 100 or transmit data provided by other components in the mobile terminal 100 to an external device.

In addition, the controller 180 controls the general operation of the mobile terminal 100. For example, the controller 180 performs various control operations regarding making/receiving a voice call, transmitting/receiving data, or making/receiving a video call. The controller 180 also includes a multimedia play module 181, which plays multimedia data. Further, the multimedia play module 181 can be implemented as a hardware device and be installed in the controller 180. Alternatively, the multimedia play module 181 can be implemented as a software program.

Also, the power supply unit 190 is supplied with power by an external power source or an internal power source and supplies power to other components in the mobile terminal 100. The mobile terminal 100 can also be connected to a wired/wireless communication system and a satellite-based communication system, and be configured to be able to operate in a communication system transmitting data as frames or packets.

Next, an exterior of the mobile terminal 100 will be described in more detail with reference to FIGS. 2 and 3. In this description, it is assumed the mobile terminal 100 is a slide-type mobile phone. However, the present invention can be applied to various types of mobile phones, other than the slide-type mobile phone.

Figure 2:
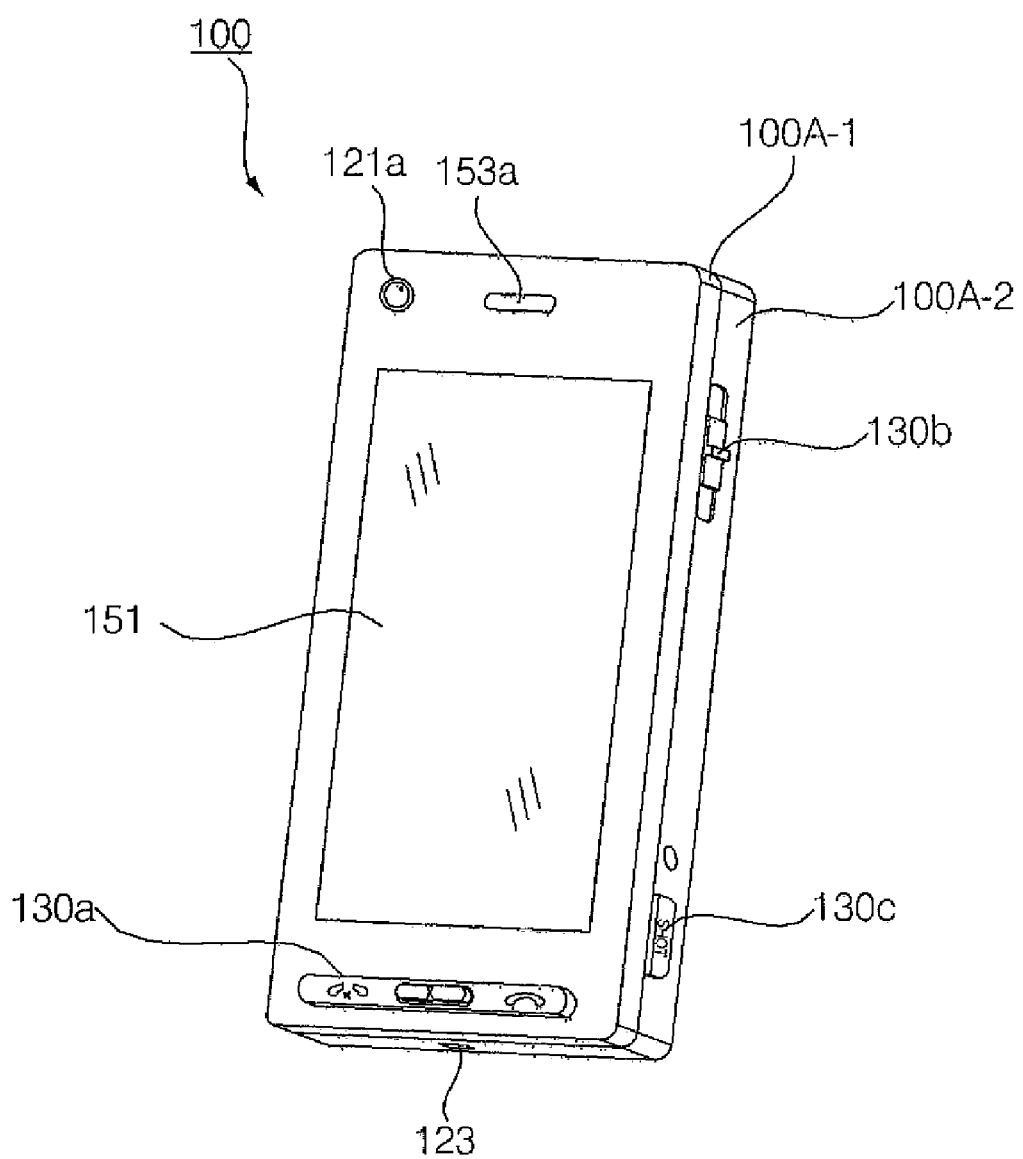
FIG. 2 is a front perspective view illustrating the mobile terminal shown in FIG. 1.

In more detail, FIG. 2 is a front perspective view illustrating the mobile terminal 100 shown in FIG. 1. As shown in FIG. 2, the mobile terminal 100 includes a front case 100A-1 and a rear case 100A-2 that form the exterior of the terminal 100. In addition, various electronic products are installed in the empty space between the front case 100A-1 and the rear case 100A-2. Also, at least one intermediate case can be disposed between the front case 100A-1 and the rear case 100A-2.

Further, the front case 100A-1 and the rear case 100A-2 can be formed of a synthetic resin through injection molding. Alternatively, the front case 100A-1 and the rear case 100A-2 can be formed of a metal such as stainless steel (STS) or titanium (Ti). In addition, in FIG. 2, the display module 151, a first audio output module 153a, a first camera 121a and a first manipulation module 130a are disposed in the main body of the mobile terminal 100, and particularly, in the front case 100A-1. Also, a second manipulation module 130b, a third manipulation module 130 and the microphone module 123 are disposed on a lateral side of the rear case 100A-2.

Further, the display module 151 can include an LCD or an OLED. In addition, because a touch pad overlaps the display module 151, the display module 151 can be used as a touch screen. Thus, it is possible for a user to input information to the display module 151 by simply touching the display module 151.

Also, the first audio output module 153a can be implemented as a receiver or a speaker, and the first camera 121a is configured to capture a still image or a moving image of a user. Further, the microphone module 123 is designed so as to be able to effectively receive the voice of a user or other sounds. In addition, the first to third manipulation modules 130a-130c may be collectively referred to as the user input unit 130. Further, the user input unit 130 can adopt various manipulation methods and also provide tactile feedback to a user.

For example, the user input unit 130 can be implemented as a dome switch or a touch pad which receives a command or information upon being pushed or touched by a user. Alternatively, the user input unit 130 can be implemented as a wheel, a jog dial, or a joystick, etc. In addition, the first manipulation module 130a allows a user to input such commands as 'start', 'end', and 'scroll', the second manipulation module 130b allows a user to choose an operating mode, and the third manipulation module 130c serves as a hot key for activating certain functions of the mobile terminal 100.

Figure 3:
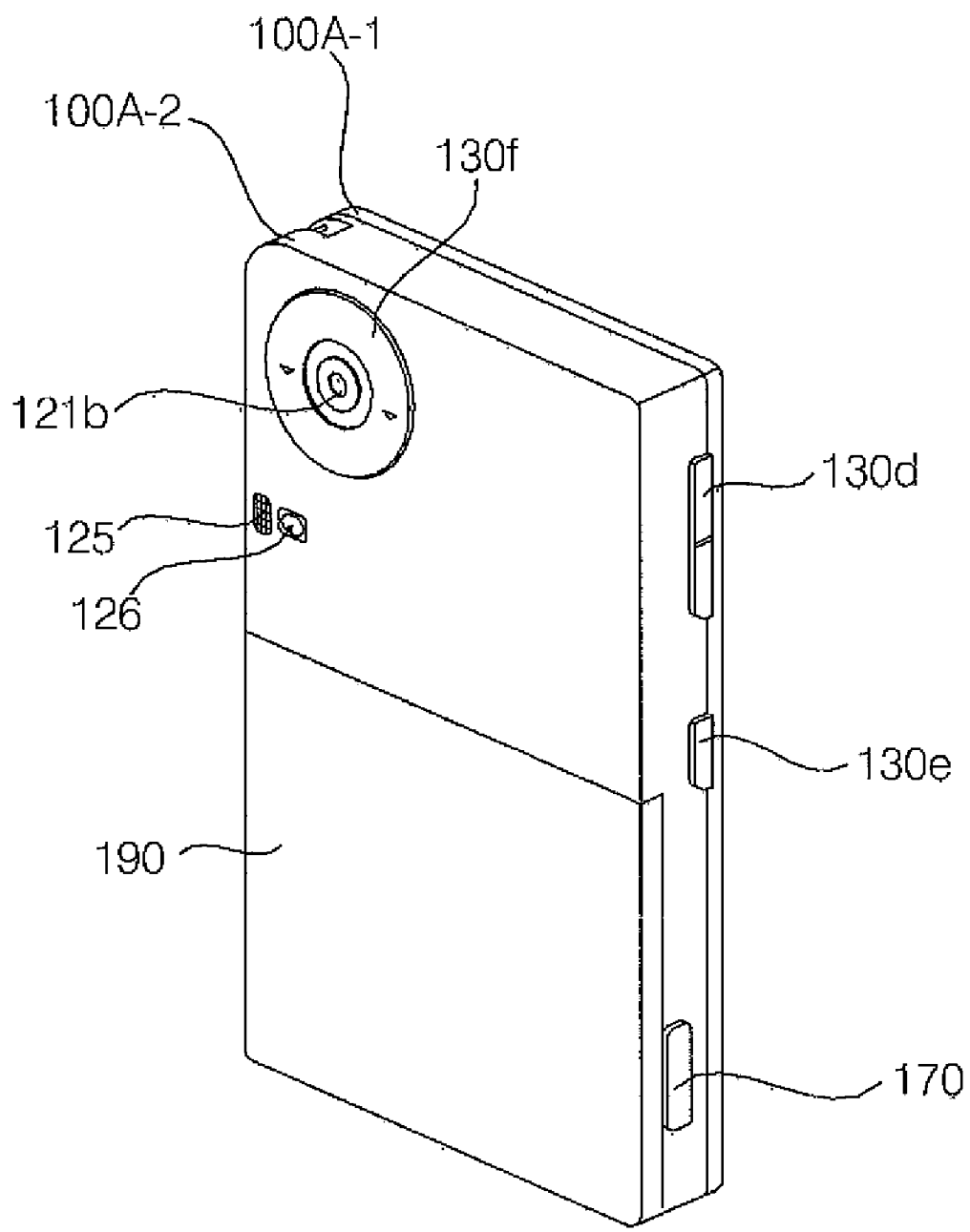
FIG. 3 is a rear perspective view illustrating the mobile terminal shown in FIG. 1.

Next, FIG. 3 is a rear perspective view illustrating the mobile terminal 100 shown in FIG. 2. As shown in FIG. 3, the mobile terminal 100 also includes a fourth manipulation module 130d and a fifth manipulation module 130e. The modules 130d and 130e as well as the interface unit 170 are disposed on a lateral side of the rear case 100A-2, and a second camera 121b is disposed at the rear of the rear case 100A-2.

Further, the second camera 121b can have a different photographing direction from that of the first camera 121a shown in FIG. 2. In addition, the number of pixels of the second camera 121b may be different from the number of pixels of the first camera 121a. For example, the first camera 121a may be used to capture an image of the face of a user and then readily transmit the captured image during a video call. Thus, a low-pixel camera can be used as the first camera 121a. Further, the second camera 121b may be used to capture an image of an ordinary subject. Given that images captured by the second camera 121b generally do not need to be transmitted, a high-pixel camera can be used as the second camera 121b.

Further, as shown in FIG. 3, a sixth manipulation module 130f is installed near the second camera 121b and can be a jog wheel capable of receiving rotation input. A camera flash 125 and a mirror 126 are also disposed near the second camera 121b. In addition, the camera flash 125 illuminates a subject when the second camera 121b captures an image of the subject. The user can also look in the mirror 126 when capturing their image.

Further, a second sound output module (not shown) may be additionally provided in the rear case 100A-2 so as to realize a stereo function along with the first audio output module 153a. The second sound output module may also be used during a speaker-phone mode. In addition, an antenna 105 (shown in FIG. 1) for receiving a broadcast signal can be disposed on one side of the rear case 100A-2. The antenna may also be installed so as to be able to be pulled out from the main body of the terminal 100.

Also, the interface unit 170 serves as a path for allowing the mobile terminal 100 to exchange data with an external device. As discussed above with respect to FIG. 1, the interface unit 170 may be a connection terminal for connecting an earphone to the mobile terminal 100 in a wired or wireless manner, a port for short-range communication or a power supply terminal for supplying power to the mobile terminal 100. The interface unit 170 may also be a subscriber identification module (SIM) or a user identification module (UIM) or may be a card socket for an exterior-type card such as a memory card for storing data.

Further, the power supply unit 190 can be inserted in the rear case 100A-2. The power supply unit 190 can be a rechargeable battery and be coupled to the rear case 100A-2 so as to be able to be attached to or detached from the rear case 100A-2. In addition, the second camera 121*b* is illustrated in FIG. 3 as being disposed in the rear case 100A-2, but can be disposed on different portions of the terminal. Also, the first camera 121*a* may be able to rotate and thus to cover the photographing direction of the second camera 121*b*. In this instance, the second camera 121*b* can be optional.

Figure 4:
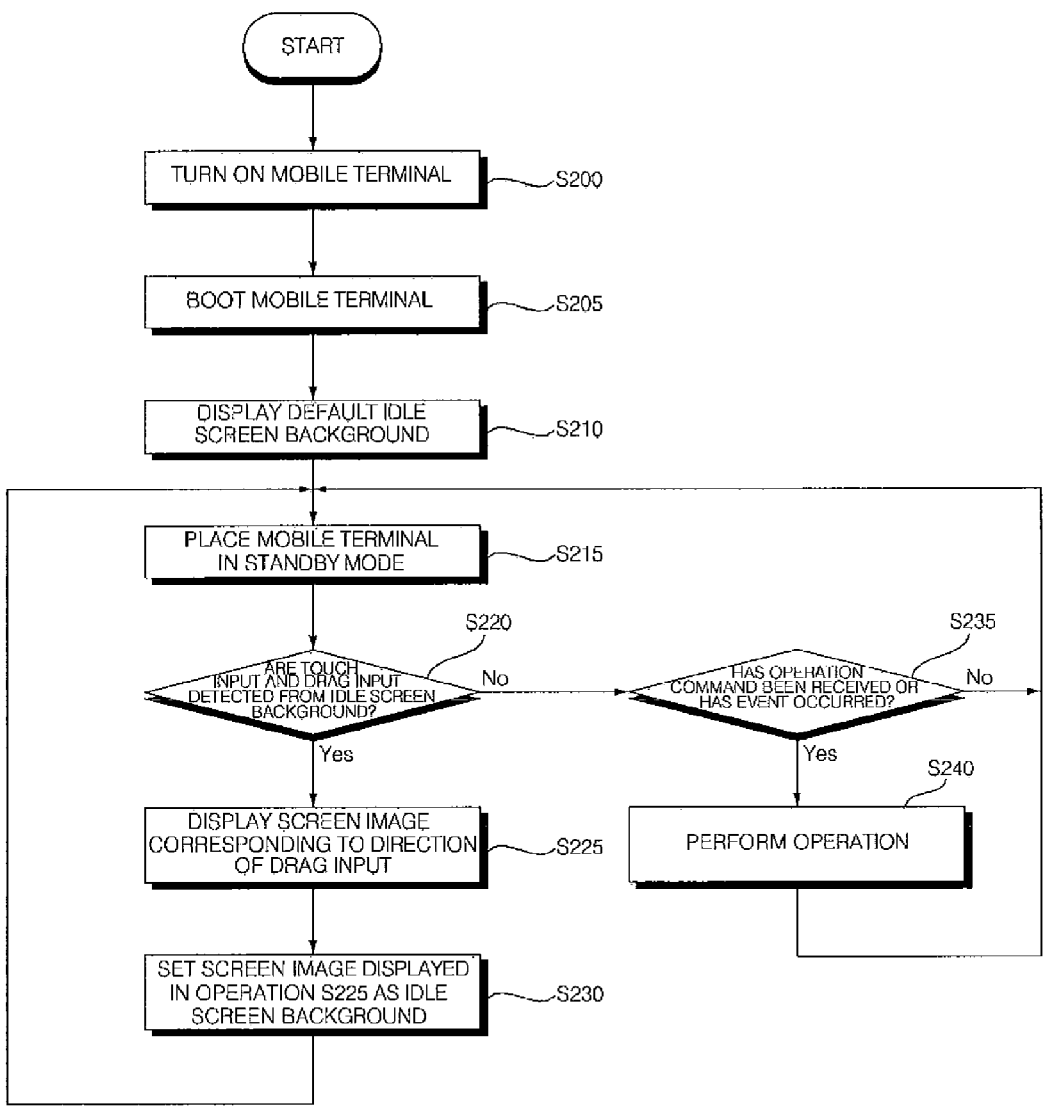
FIG. 4 is a flowchart illustrating a method of controlling a mobile terminal according to an embodiment of the present invention.

Next, FIG. 4 is a flowchart illustrating a method of controlling a mobile terminal according to an embodiment of the present invention. As shown in FIG. 4, the mobile terminal 100 is turned on by pressing a predetermined key of the user input unit 130 (S200). Then, the controller 180 performs a booting operation by executing a booting program stored in the memory 160 (S205), and displays a default idle screen background (S210). Then, the mobile terminal 100 switches to an idle state (S215).

In addition, to save power, the controller 180 can automatically switch off a touch screen if there is no user input such as touch input or key input for more than a predefined amount of time. Also, when a touch or key input is received through the user input unit 130, the controller 180 can switch on the touch screen, and display the default idle screen on the touch screen.

The controller 180 also determines if the user has performed a touch and drag operation on the touch screen (S220). If the controller 180 determines the user has performed or selected a different operation than the touch and drag operation (No in S220), the controller 180 determines if the user has requested a particular function or an event has occurred (S235). For example, the user may make or receive a call, send a text or email, etc. In this instance (Yes in S235), the controller 180 performs the requested function. The method then returns to the step S215.

Alternatively, if the controller 180 determines the user has performed the touch and drag operation on the displayed default screen (Yes in S220), the controller 180 displays a screen image corresponding to the direction of the drag input (S225). Further, examples of the direction of the touch and drag input include a vertical direction, a horizontal direction, a diagonal direction or an arbitrary direction chosen according to the environment of the use of the mobile terminal 100. Also, the screen image corresponding to the direction of the touch and drag input operation can be a screen image chosen from a plurality of operation menu screens provided by the mobile terminal 100 such as a main menu screen or a screen image created by a user.

Figure 6:
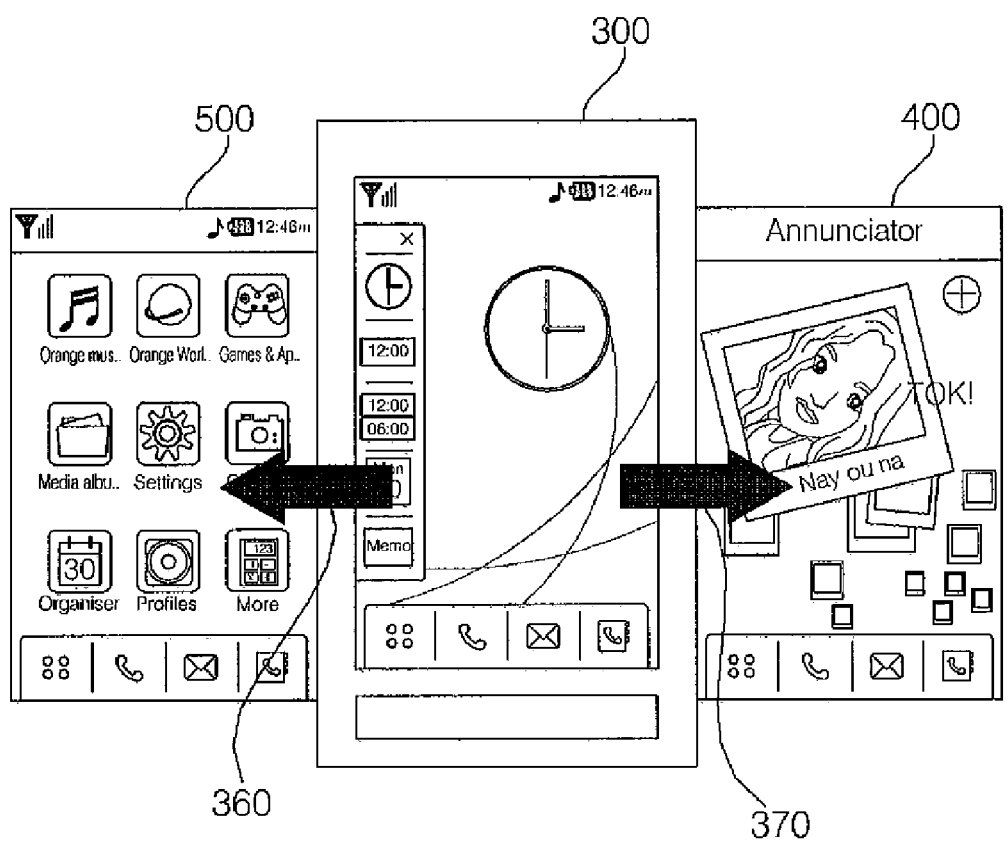
FIG. 6 is an overview of background display screens according to an embodiment of the present invention.

For example, the user can select a personal photograph be used as the idle screen background by selecting a photo menu option to view photos stored in a corresponding photo album directory on the terminal. The user can then select a particular photo stored in the photo album directory to be the idle background screen. The screen image 400 in FIG. 6 illustrates one example of a personal photograph being used as the idle background screen.

The user can also designate a plurality of operation menu screens be used as the idle background screen. The screen image 500 in FIG. 6 illustrates such an example. In the screen image 500, the user can touch or select a particular menu option (e.g. settings) to view or execute functions contained within the particular menu option. The user can also designate which touch and drag direction is assigned to which background screen using menu options on the terminal.

That is, the user can choose a number of screen images that can be displayed as an idle screen background, and designate the screen images for different touch and drag directions such as a vertical direction, a horizontal direction and a diagonal direction. Also, if no screen image is designated for the direction of the touch and drag operation, the controller 180 can continuously display the default idle screen background as the idle screen of the mobile terminal 100, and output a message indicating that no screen image is designated for the direction of the drag input.

Further, when the screen image corresponding to the direction of the touch and drag input operation is displayed on the touch screen, the controller 180 sets the screen image corresponding to the direction of the touch and drag input operation as an idle screen background so that the selected screen image is displayed on the touch screen as an idle screen background when the mobile terminal 100 is rebooted (S230). In addition, the idle screen data regarding the setting of the screen image may be stored in the memory 160. Thus, when the mobile terminal 100 is rebooted, the controller 180 can display the selected background screen image as an idle screen background with reference to the idle screen data present in the memory 160. The mobile terminal 100 can also generate a haptic effect such as vibration whenever a new idle screen background is set.

Thus, in this manner, the user can easily set a screen image corresponding to a selected image. That is, in the embodiment of FIG. 4, the touch-and-drag method is used to set a new idle screen background. However, the present invention applies to other input methods such as a touch flick input method. In this instance, the touch flick input signal can be generated by a user gently flicking their finger(s) on the touch screen.

Figure 5:
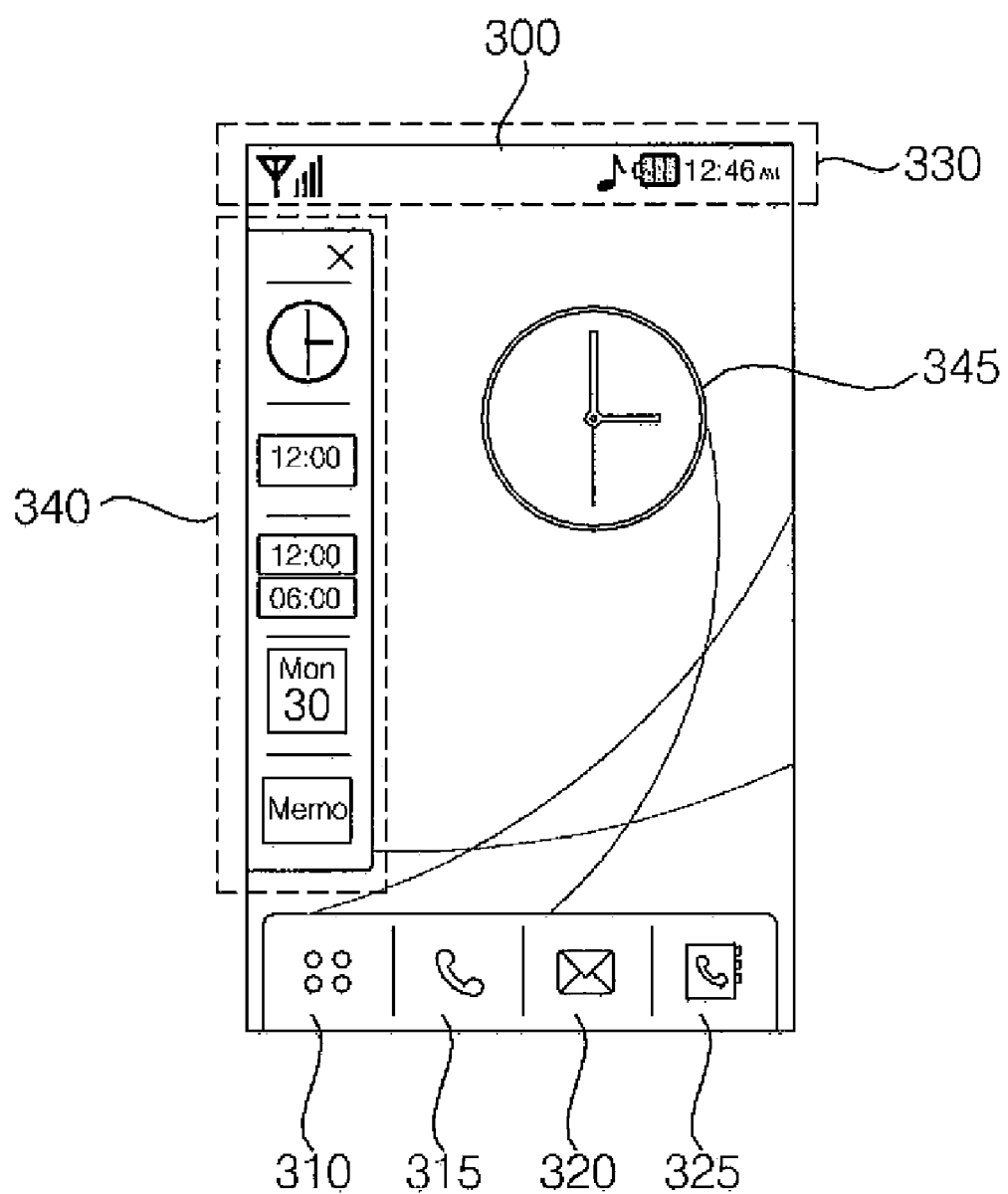
FIG. 5 is an overview illustrating an initial display screen according to an embodiment of the present invention.

Next, FIG. 5 is an overview of an idle display background screen 300 according to an embodiment of the present invention. As shown in FIG. 5, the top portion of the default idle background screen 300 includes a number of indicator icons 330, and the bottom portion includes an icon 310 for choosing a menu, an icon 315 for making/receiving a call, an icon 320 for choosing a message menu, and an icon 325 for terminating a call.

A sidebar 340 may also be selectively displayed on the left side of the default idle background screen 300. As shown, the sidebar 340 includes a number of gadgets for executing various mini applications. Further, when one of the gadgets in the sidebar 340 is chosen, an application corresponding to the chosen gadget is displayed on the default idle background screen 300, as indicated by the reference numeral 345 in FIG. 5.

Figure 7:
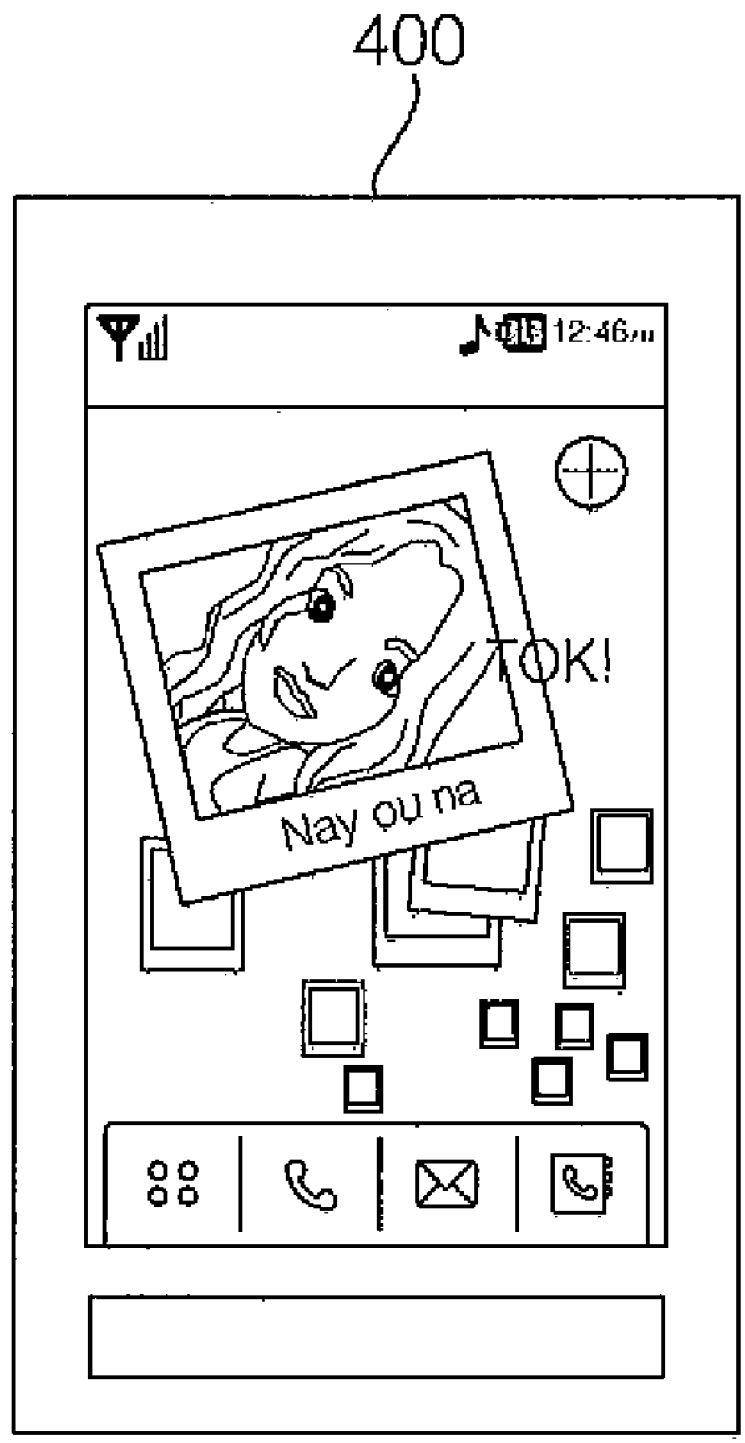
FIG. 7 is an overview of user selected background display screen according to an embodiment of the present invention.

Next, FIGS. 6 and 7 are overviews of display screens for explaining how to set a screen image as an idle background screen using a touch-and-drag method according to an embodiment of the present invention. In more detail, FIG. 6 illustrates a screen image 400 that is an idle background screen candidate designated for a left-to-right touch and drag direction with respect to the default idle screen background 300. Similarly, a screen image 500 is an idle background screen candidate designated for a right-to-left touch and drag direction with respect to the default idle screen background 300.

Thus, if the user performs a right-to-left touch and drag operation, as indicated by reference numeral 370 in FIG. 6, the screen image 400 is displayed on the idle screen of the mobile terminal 100 as a new idle background screen, as illustrated in FIG. 7. Further, the screen image 400 can be used an idle background screen even when the mobile terminal 100 is rebooted.

Alternatively, if the user performs a left-to-right touch and drag operation, as indicated by reference numeral 360 in FIG. 6, the screen image 500 is displayed on the idle screen of the mobile terminal 100 as an idle background screen. The screen image 500 can also be used as an idle screen background even when the mobile terminal 100 is rebooted.

Therefore, according to embodiments of the present invention, the user can easily set one of a plurality of screen images to be a background idle screen based on different touch and drag (or flick) input directions. Further, the user can set the screen image to be the default background screen using a variety of touch and drag operations such as the left-to-right direction, the right-to-left direction, the vertical direction, the diagonal direction as well as particular directions set by the user. For example, the user can draw a smiley face on the touch screen and then request that this touch and drag operation be used to set a default idle screen.

In more detail, the user can select the appropriate menu options provided on the terminal according to an embodiment of the present invention to set the terminal to be in a recognition mode. In this recognition mode, the controller 180 determines the pattern drawn on the touch screen by the user as being the pattern that initiates the method for setting the idle background screen. Thus, whenever the same pattern is drawn on the terminal, the controller 180 can recognize the drawn pattern as being an instruction for initiating the idle background screen setting operations.

In addition, the terminal can be a mobile phone, a smart phone, a laptop book computer, a digital broadcast receiver, a personal digital assistant (PDA), a portable multimedia player (PMP), a navigation device, etc. Further, embodiments of the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, etc. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

Further, because the user can set the background screen to be any background screen image they desire, the user is given greater flexibility to customize their own terminal compared to the situation in which the default screens are limited to those set by the manufacturer of the terminal. The user can also set the touch and drag operation that they want to be used to set a particular background screen thereby increasing the user's flexibility to customize their own terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile terminal, the method comprising:
   entering the mobile terminal into an idle mode;
   displaying a first background screen on a touch screen of the mobile terminal when the mobile terminal enters into the idle mode;
   receiving a first touch and drag input operation in a first direction on the touch screen of the mobile terminal;
   displaying a second idle background screen on the touch screen of the mobile terminal based on the received first touch and drag input operation;
   receiving a second touch and drag input operation in a second direction on the touch screen of the mobile terminal; and
   displaying a third idle background screen on the touch screen of the mobile terminal based on the received second touch and drag input operation,
   wherein the first, second and third idle background screens allow the mobile terminal to operate in an active non-locked mode, and
   wherein the second idle background screen is automatically displayed and set as the idle background screen to be used when the mobile terminal enters into the idle mode based on the received first touch and drag input operation and without receiving any additional input operations.

2. The method of claim 1, wherein the first and second directions of the first and second touch and drag input operations are one of a vertical direction, a horizontal direction and a diagonal direction.

3. The method of claim 1, wherein the first and second directions of the touch and drag input operations are preset and mapped to the second and third idle background screens, respectively, by a user of the terminal.

4. The method of claim 1, wherein the first, second and third idle background screens are created or selected by a user of the terminal.

5. The method of claim 1, wherein the first, second and third idle background screens are created or selected from a plurality of operation menu screens.

6. The method of claim 1, further comprising:
   determining if the selected one of the first, second and third idle background screens has been previously designated; and
   outputting a message indicating the selected idle background screen has not been designated, when the determining step determines the selected idle background screen has not been selected.

7. The method of claim 1, further comprising:
   displaying an operation control menu on the touch screen and performing an operation corresponding to a menu item selected from the operation control menu.

8. The method of claim 1, wherein the idle mode occurs after a booting of the mobile terminal when the mobile terminal is powered on.

9. A mobile terminal, comprising:
   a display unit including a touch screen and configured to display an idle background screen on a touch screen of the mobile terminal when the mobile terminal is in an idle mode; and
   a control unit configured to control the display unit to display a first idle background screen on a touch screen of the mobile terminal when the mobile terminal enters into the idle mode, to receive a first touch and drag input operation in a first direction on the touch screen of the mobile terminal, to display a second idle background screen on the touch screen of the mobile terminal based on the received first touch and drag input operation, to receive a second touch and drag input operation in a second direction on the touch screen of the mobile terminal, and to display a third idle background screen on the touch screen of the mobile terminal based on the received second touch and drag input operation, wherein the first, second and third idle background screens allow the mobile terminal to operate in an active non-locked mode, wherein the control unit is further configured to automatically display and set the second idle background screen as the idle background screen to be used when the mobile terminal enters into the idle mode based on the received first touch and drag input operation and without receiving any additional input operations.

10. The mobile terminal of claim 9, wherein the first and second directions of the first and second touch and drag input operations are one of a vertical direction, a horizontal direction and a diagonal direction.

11. The mobile terminal of claim 9, wherein the first and second directions of the first and second touch and drag input operations are preset and mapped to the second and third idle background screens, respectively, by a user of the terminal.

12. The mobile terminal of claim 9, wherein the first, second and third idle background screens are created or selected by a user of the terminal.

13. The mobile terminal of claim 9, wherein the first, second and third idle background screens are created or selected from a plurality of operation menu screens.

14. The mobile terminal of claim 9, wherein the control unit is further configured to determine if the selected idle background screen has been previously designated, and to output a message indicating the selected idle background screen has not been designated, when the selected idle background screen has not been selected.

15. The mobile terminal of claim 9, wherein the control unit is further configured to control the display unit to display an operation control menu on the touch screen and to perform an operation corresponding to a menu item selected from the operation control menu.

16. The mobile terminal of claim 9, wherein the idle mode occurs after a booting of the mobile terminal when the mobile terminal is powered on.

* * * * *